(12) United States Patent
Shedletsky (10) Patent No.: US 10,191,528 B2
(45) Date of Patent: Jan. 29, 2019

(54) SENSOR FOR DETECTING PRESENCE OF MATERIAL

(71) Applicant: Apple Inc., Cupertino, CA (US)

(72) Inventor: Anna-Katrina Shedletsky, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 15/217,921

(22) Filed: Jul. 22, 2016

(65) Prior Publication Data

US 2016/0334851 A1    Nov. 17, 2016

Related U.S. Application Data

(63) Continuation of application No. 14/915,223, filed as application No. PCT/US2014/031253 on Mar. 19, 2014.

(30) Foreign Application Priority Data

Aug. 28, 2013    (WO) ................ PCT/US2013/057159

(51) Int. Cl.
  *G09G 5/00*    (2006.01)
  *G06F 1/16*    (2006.01)
  (Continued)

(52) U.S. Cl.
  CPC ............ *G06F 1/3206* (2013.01); *G06F 1/163* (2013.01); *G06F 1/1626* (2013.01);
  (Continued)

(58) Field of Classification Search
  CPC .... G09G 5/003; G09G 5/363; G09G 2340/14; G09G 2320/10; G09G 2320/0606;
  (Continued)

(56) References Cited

U.S. PATENT DOCUMENTS 5,483,261 A    1/1996 Yasutake
5,488,204 A    1/1996 Mead et al.
(Continued)

FOREIGN PATENT DOCUMENTS

JP    2000-163031 A    6/2000
JP    2002-342033 A    11/2002

OTHER PUBLICATIONS

International Search Report dated Aug. 21, 2014, for PCT Application No. PCT/US2014/31253, filed Mar. 19, 2014, three pages.
(Continued)

*Primary Examiner* — Jennifer Nguyen
(74) *Attorney, Agent, or Firm* — Morrison & Foerster LLP (57) ABSTRACT

A device having one or more sensors configured to detect a material covering the device, and logic configured to detect one or more characteristics of the material and change an operating state of the device based on the detected one or more characteristics. In some examples, the one or more sensors can be ambient light sensors (ALS), proximity sensors and/or cameras. In some examples, the device can change the operating state of a processor, a touch panel and/or a display. In some examples, the device can detect a direction of coverage of the material, a color of the material and/or a usage state of the device. In some examples, the device can change its operating state based on a pattern of the one or more characteristics and/or information in addition to the one or more characteristics. In some examples, the device can receive the information from an external device.

22 Claims, 8 Drawing Sheets

(51) Int. Cl.
*G06F 3/041* (2006.01)
*G06F 3/14* (2006.01)

(52) U.S. Cl.
CPC .......... *G06F 1/3218* (2013.01); *G06F 1/3231* (2013.01); *G06F 1/3243* (2013.01); *G06F 1/3246* (2013.01); *G06F 1/3262* (2013.01); *G06F 1/3265* (2013.01); *G06F 3/0416* (2013.01); *G06F 3/14* (2013.01); *G06F 2203/04101* (2013.01); *Y02D 10/152* (2018.01); *Y02D 10/153* (2018.01); *Y02D 10/173* (2018.01)

(58) Field of Classification Search
CPC ... G09G 2320/08; G06F 3/0484; G06F 1/163; G06F 1/3206; G06F 1/1626; G06F 1/3231; G06F 1/3218; G06F 3/0416; G06F 1/3265; G06F 1/3262; G06F 1/3246; G06F 1/3243; G06F 2203/04101
USPC ......... 345/156, 169, 173; 600/300, 390, 479
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,616,110 B2 | 11/2009 | Crump et al. | |
| 7,663,607 B2 | 2/2010 | Hotelling et al. | |
| 8,378,811 B2 | 2/2013 | Crump et al. | |
| 8,479,122 B2 | 7/2013 | Hotelling et al. | |
| 8,618,930 B2 | 12/2013 | Papadopoulos et al. | |
| 2006/0197753 A1 | 9/2006 | Hotelling | |
| 2009/0079721 A1 | 3/2009 | Gettemy | |
| 2011/0273378 A1* | 11/2011 | Alameh | H04M 1/72569 345/173 |
| 2012/0194448 A1* | 8/2012 | Rothkopf | A45C 13/002 345/173 |
| 2012/0280917 A1 | 11/2012 | Toksvig et al. | |
| 2013/0119255 A1* | 5/2013 | Dickinson | G04G 21/00 250/340 |
| 2013/0222323 A1* | 8/2013 | McKenzie | G06F 1/169 345/174 |
| 2013/0328914 A1* | 12/2013 | Smith | G06F 3/01 345/619 |
| 2014/0155705 A1 | 6/2014 | Papadopoulos et al. | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SENSOR FOR DETECTING PRESENCE OF MATERIAL

CROSS-REFERENCE TO RELATED APPLICATIONS

This application is a continuation of U.S. patent application Ser. No. 14/915,223, with a 371(c) filing date of Feb. 27, 2016, which is a National Phase application under 35 U.S.C. § 371 of International Application No. PCT/US2014/031253, filed Mar. 19, 2014, which claims the priority benefit of International Application No. PCT/US2013/057159, filed Aug. 28, 2013, the contents of which are all hereby incorporated by reference in their entireties for all intended purposes.

FIELD OF THE DISCLOSURE

This relates generally to preserving battery life in a portable electronic device, and more specifically to doing so based on device status determined using information from one or more sensors.

BACKGROUND OF THE DISCLOSURE

Portable electronic devices, such as mobile telephones, portable media players or wearable devices such as watches or smart watches, generally operate using some form of battery power. Batteries, however, usually only provide a limited amount of power for a limited amount of time before being drained. Therefore, portable electronic devices can have stringent power consumption requirements to make sure that they are able to power the device for an adequate amount of time, without requiring big and heavy batteries to do so.

To conserve battery power, it can be beneficial to temporarily turn off selected components of a portable electronic device that can consume a lot of power. A display on a portable electronic device, for example, can consume a large portion of the power used by the device. Some example displays on portable electronic devices can be liquid crystal displays (LCD), electroluminescent displays (ELD), field emission displays (FED), light-emitting diode displays (LED), organic light-emitting diode displays (OLED), quantum dot displays (QLED), and many other types of displays. However, a user's experience with the portable electronic device can be negatively impacted if parts of the device (e.g., the display) have been turned off when the user wishes to use the device. Having the ability to turn off components while maintaining a positive user experience can therefore be desired.

SUMMARY OF THE DISCLOSURE

The following description includes examples of detecting a material partially or fully covering a device. The device can include a display. The device can also include one or more sensors for detecting the material, and can change its operating state (e.g., turn off its display) based on whether and how much the material is covering the device. The sensors can be sensors such as ambient light sensors (ALS), proximity sensors and/or cameras. In some examples, the device can process outputs from the one or more sensors itself. In other examples, the device can partially or fully offload the processing of the outputs from the one or more sensors to a host. In other examples, the device can use information (e.g., weather information) in addition to the outputs from the one or more sensors to change its operating state.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A portable electronic device can include a display, which can be an integral gateway through which a user can interact with the device. The display, along with other components in the device, can consume a substantial amount of the device's battery power. That consumed power can instead be conserved by temporarily turning the display off. However, a user can have a contrary expectation that the display will always be on without the need for the user to interact with the device to turn the screen on. To meet the user's expectation while saving power, power can be conserved by turning off the display during times when it may be unlikely that the user will be looking at the portable electronic device and/or its display. An exemplary period of time when the user is unlikely to be looking at or able to see the display can be when the portable electronic device is covered by material, such as a user's clothing. Other components of the portable electronic device, such as a processor, can additionally or alternatively be turned off in such circumstances. In other examples, even devices without displays can have certain components or functions disabled or turned off when it is determined that the device is covered by a material such as clothing. For example, a device may not incorporate a display, but may instead have other types of user interfaces such as a multitude of sensors, a touch sensitive region without a display, or even a traditional mechanism such as the hands on a watch. In these examples, it may still be beneficial to disable certain components or functions when it is determined that the device is covered by material and unlikely to be actively in use by the user.

Figure 1A:
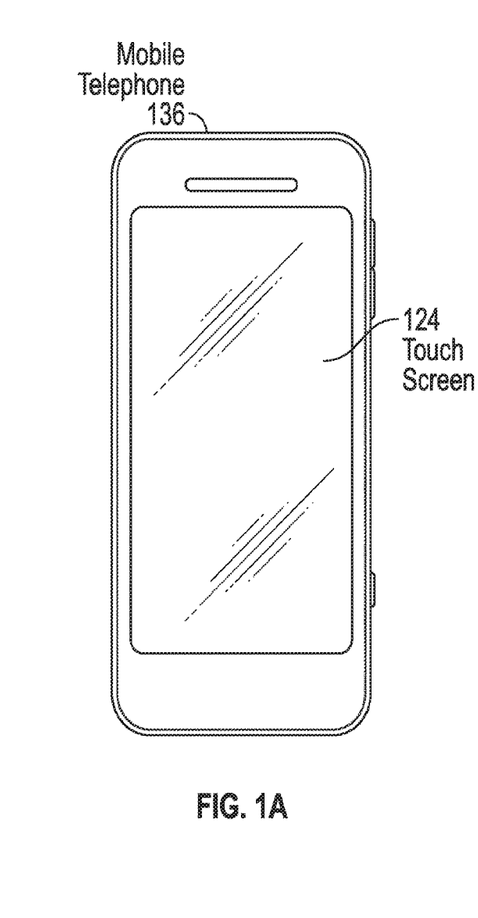
FIG. 1A illustrates an example mobile telephone that includes a touch screen.
Figures 1B, 1C:
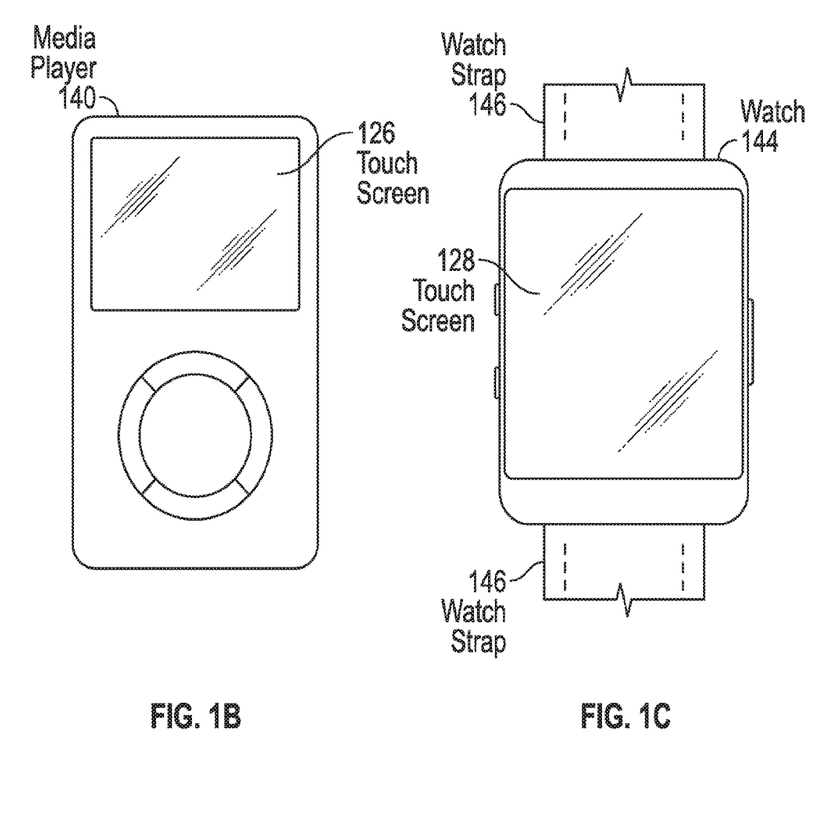
FIG. 1B illustrates an example digital media player that includes a touch screen.
FIG. 1C illustrates an example wearable electronic device, such as a smart watch, that includes a touch screen.

FIGS. 1A-1C illustrate example portable electronic devices in which material detection according to examples of the disclosure may be implemented. FIG. 1A illustrates an example mobile telephone 136 that includes touch screen 124. Touch screen 124 can include a touch panel portion for touch detection, and a display portion for displaying images on the touch screen. As used throughout this disclosure, "touch screen" can refer to the touch panel portion of a touch screen, the display portion of the touch screen, or both. FIG. 1B illustrates an example digital media player 140 that includes touch screen 126. FIG. 1C illustrates an example watch 144 that includes touch screen 128. Touch screens 124, 126 and 128 may be based on, for example, self capacitance or mutual capacitance, or another touch sensing technology. For example, in a self capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of one or more objects when they touch the touch screen. A mutual capacitance based touch system can include, for example, drive regions and sense regions, such as drive lines and sense lines. For example, drive lines can be formed in rows while sense lines can be formed in columns (i.e., drive lines and sense lines can be orthogonal). Touch pixels (touch nodes) can be formed at the intersections or adjacencies (in single layer configurations) of the rows and columns During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of one or more objects when they touch the touch screen. In some examples, a touch screen can be multi-touch, single touch, projection scan, full-imaging multi-touch, or any capacitive touch.

The display portions of touch screens 124, 126 and 128 may be based on display types such as liquid crystal displays (LCD), electroluminescent displays (ELD), field emission displays (FED), light-emitting diode displays (LED), organic light-emitting diode displays (OLED), or quantum dot displays (QLED). Many other types of display technologies can also be used in touch screens 124, 126 and 128, and are equally within the scope of this disclosure.

Figure 2A:
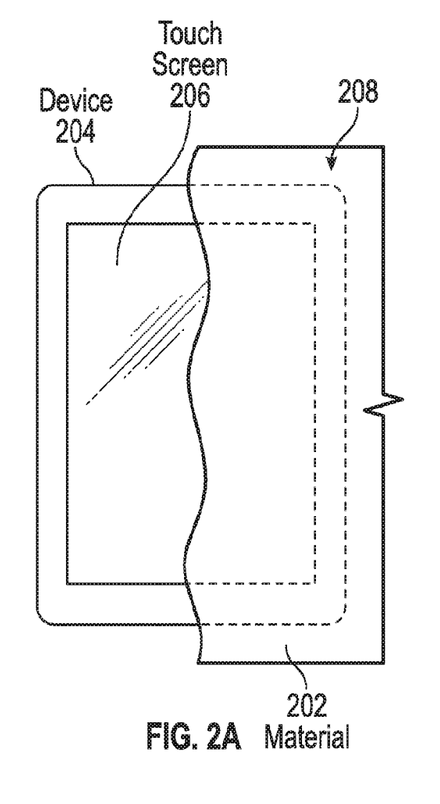
FIG. 2A illustrates an example partial covering of a device and a touch screen by a material.
Figure 2B:
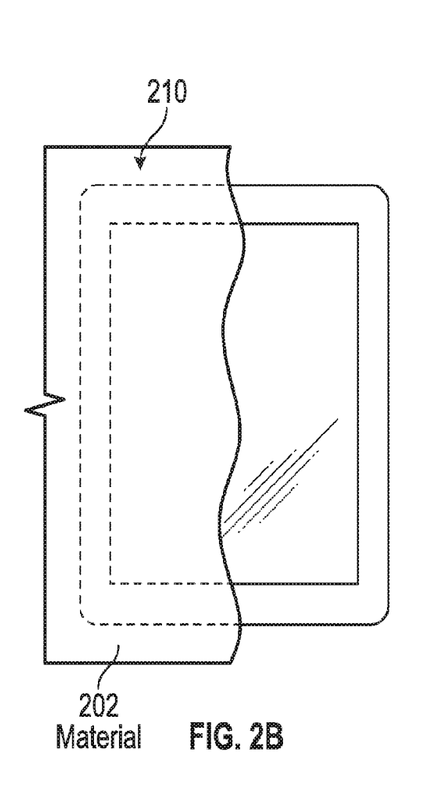
FIG. 2B illustrates another example partial covering of a device and a touch screen by a material.

As stated above, the devices of the disclosure can sometimes be covered by a material, such as a user's clothing FIG. 2A illustrates the partial covering of device 204 and touch screen 206 by material 202. Device 204 can be a device such as those in FIGS. 1A-1C. Material 202 can be, for example, a fabric such as the fabric of a user's clothing. Material 202 can also be any other material that can partially or completely cover the surface of device 204 that includes touch screen 206. In the example of FIG. 2A, material 202 is covering a right portion 208 of device 204 and touch screen 206. FIG. 2B illustrates another partial covering of device 204 and touch screen 206 by material 202. In particular, in FIG. 2B, material 202 is covering a left portion 210 of device 204 and touch screen 206. The partial coverings of FIGS. 2A-2B can occur if, for example, device 204 is a watch or other wearable device on a user's wrist, torso, arm or leg, and material 202 is the end of the user's sleeve, glove, top, or pant leg. The partial coverings of FIGS. 2A-2B can also occur if, for example, device 204 is a mobile telephone sitting face up on a surface, and material 202 is an object that is lying partially on top of the device. In another example, the partial coverings of FIGS. 2A-2B can occur if a portable device is partially situated inside a pocket of a user's clothing.

Figure 2C:
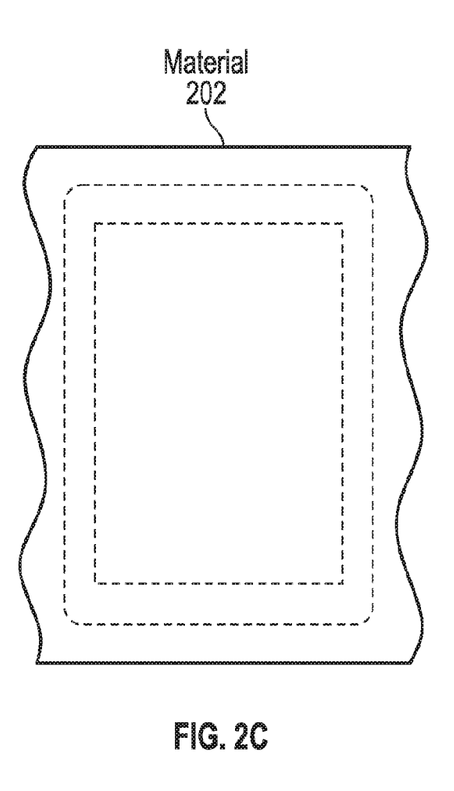
FIG. 2C illustrates an example complete covering of a device and a touch screen by a material.

FIG. 2C illustrates a complete covering of device 204 and touch screen 206 by material 202. In particular, material 202 is covering the entire surface of device 204 and touch screen 206. The complete covering shown in FIG. 2C can occur if, for example, device 204 is a mobile telephone or a media player in a user's pants pocket or purse/backpack, and material 202 is the material of the user's pants pocket or purse/backpack. The complete covering of FIG. 2C can also occur if, for example, device is a watch or other wearable device on a user's wrist, torso, arm or leg, and material 202 is the end of the user's sleeve, glove, top or pant leg that completely covers the device. The coverage scenarios above are provided by way of example only, and are understood to not limit the scope of this disclosure to their descriptions. Further, the extent to which a material is covering the device (e.g., the material is covering 20% of the device surface) can be a "characteristic" of the material covering the device, and in some examples, the device can respond accordingly to different extents of coverage.

In the scenarios in FIGS. 2A-2C, when touch screen 206 is partially or completely covered by material 202, it can be the case that the user cannot see what is displayed on the touch screen. In such a circumstance, it can be likely that the user is not looking at touch screen 206. As such, device 204 can reduce its power consumption by, for example, partially or completely turning off touch screen 206. As stated above, touch screen 206 can include a touch panel portion and a display portion. By describing that device 204 can partially or completely turn off touch screen 206, it is understood that the device can partially or completely turn off the touch panel portion of the touch screen, the display portion of the touch screen, or both. The above description of touch screen 206 applies equally to other examples in this disclosure, and it is understood that any changes in operation of the touch screen can be changes in operation of the touch panel portion, the display portion, or both.

Device 204 can partially turn off touch screen 206 by changing the touch screen's brightness, or by turning off a portion of touch screen (e.g., the portion that is covered). Device 204 can additionally or alternatively take other actions, such as entering different modes of operation based on whether the device is partially or fully covered by material 202, and/or entering different modes of operation based on how much the device is covered (i.e., based on the characteristic of the material as to how much of the device the material is covering). For example, device 204 can enter a low-power operation mode in which a processor inside the device can be turned off, or its functionality reduced, while the device is partially or completely covered by material 202. Or, the device can wait until it is 70% covered before entering the low-power operation mode, for example.

Various components, such as touch screen 206 or the processor, need not be turned off immediately upon sensing that device 204 is covered by material 202. Rather, touch screen 206 can be turned off immediately, for example, and the processor inside device 204 can be turned off or reduced in functionality if the device remains in a covered state for a predetermined period of time, such as one minute, for example.

In order to determine whether device 204 is partially or completely covered by material 202, it can be useful to incorporate one or more sensors into the device that can detect the presence or absence of the material covering the device.

In the description that follows, it is understood that regardless of whether device 204 determines that it is likely covered by material 202, if a user interacts with the device by, for example, entering a user input, the device can respond by entering a normal operating mode (i.e., turning touch screen and processor on). In such a circumstance, it is likely that the user can see, and is looking at, touch screen 206 on device 204. Therefore, the material coverage determinations that will be described below can be overridden. Device 204 can sense a user input through touch screen 206 because, for example, all or some of the touch panel portion of the touch screen can remain on even while all or some of the display portion of the touch screen is off.

Figures 3A, 3B:
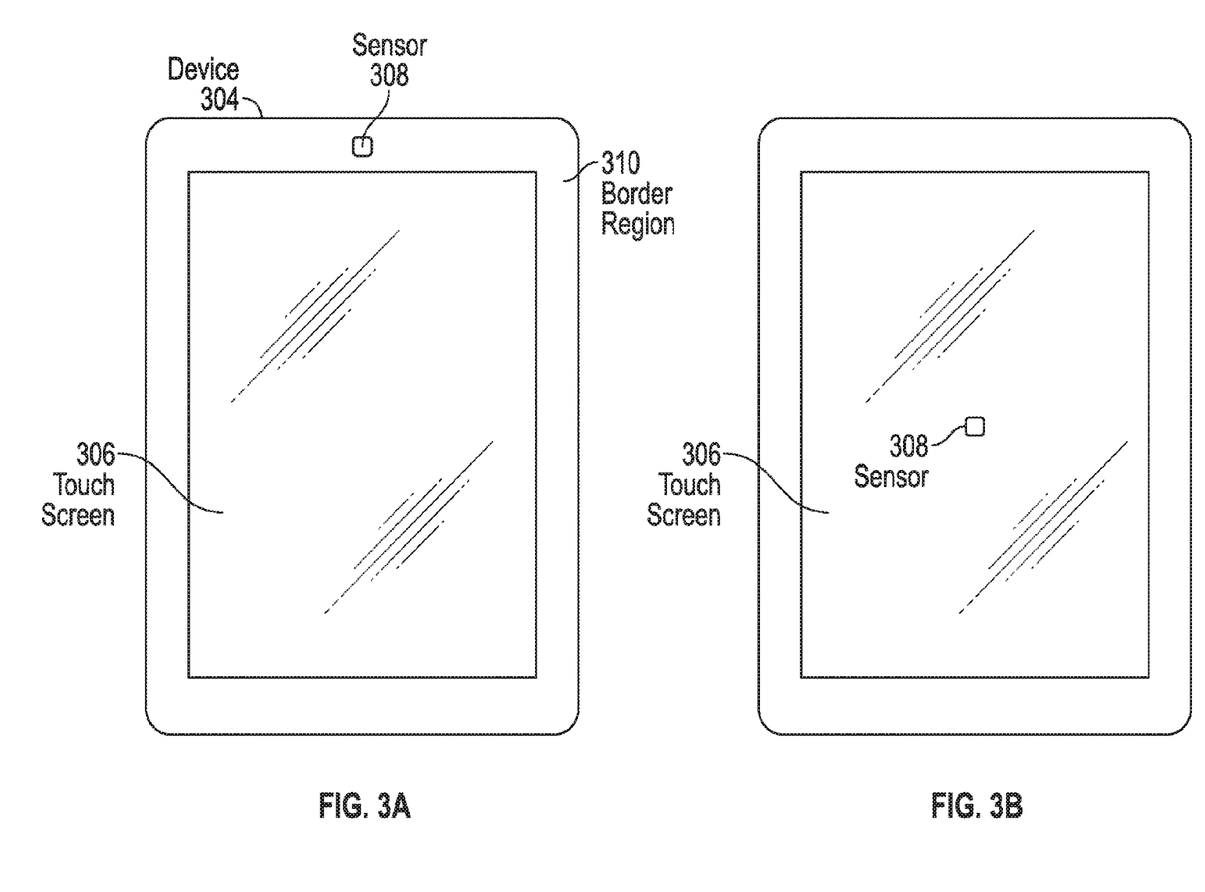
FIG. 3A illustrates an example device with a sensor in a border region of the device.
FIG. 3B illustrates an example of an alternative placement of a sensor in a device.

FIGS. 3A-3B illustrate exemplary configurations of device 304 incorporating sensor 308. FIG. 3A illustrates device 304 with sensor 308 in border region 310 of the device. Border region 310 can be a region of device 304 that can exist between the edge of touch screen 306 and the edge of the device. Sensor 308 can be incorporated into border region 310 such that when a material covers the sensor, the sensor can sense the presence of the material covering the region into which the sensor is incorporated. The placement of sensor 308 shown in FIG. 3A is exemplary only, and does not limit the scope of this disclosure to the sensor placement illustrated.

FIG. 3B illustrates an alternative placement of sensor 308 in device 304. In this example, sensor 308 can be placed within touch screen 306. In some examples, sensor 308 can be placed underneath touch screen 306 in such a way as to allow the sensor to function through the touch screen (e.g., in an OLED display, the sensor can be placed behind the display). In some examples, sensor 308 can be placed on top of touch screen 306 in such a way as to not hinder the ability of the touch screen to display content through or around the sensor. In some examples, sensor 308 can be incorporated into the structure of touch screen 306 (i.e., the sensor can be manufactured in the same process layers as the touch screen). The placement of sensor 308 shown in FIG. 3B is exemplary only, and does not limit the scope of this disclosure to the sensor placement illustrated. Although FIGS. 3A-3B only show an example device with one sensor, it should be understood that in other examples, multiple sensors may be employed.

Figure 4A:
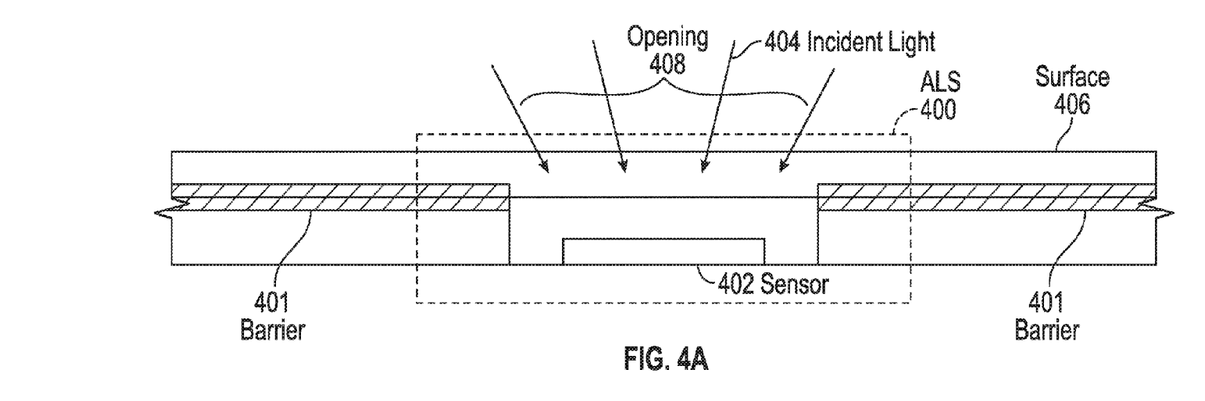
FIG. 4A illustrates the structure and operation of an exemplary ambient light sensor (ALS) for use in the device of the examples of this disclosure when not covered by a material.

Many different types of sensors may be suitable for use in detecting the absence or presence of material covering device 304. Some such sensors can be ambient light sensors (ALS), proximity sensors (e.g., photodiode and LED pairs) and cameras. FIG. 4A illustrates the structure and operation of an exemplary ALS 400 for use in the device of the examples of this disclosure when not covered by a material. ALS 400 can be formed of sensor 402 placed inside surface 406 of the device. Surface 406 of the device can be, for example, the surface of the touch screen of the device, if ALS 400 is incorporated within the touch screen, or the surface can be the surface of the border region of the device, if the ALS is incorporated within the border region.

Sensor 402 can measure light incident on it through opening 408. Opening 408 can be defined by barrier 401. Barrier 401 can be any region that can be substantially opaque to light, for example a dark ink layer or a light shield. Opening 408 can be any section of surface 406 that can allow the transmission of light through it, such that the light can reach sensor 402. For example, opening 408 can be a section of surface 406 that contains no structure at all such that sensor 402 is exposed to an environment external to the device. Alternatively, opening 408 can be a section of surface 406 that includes structure and that can allow at least some light transmission through it, such as an optically transparent glass or plastic. It is understood that other structures that can allow at least some light transmission to sensor 402 can be suitable for use as opening 408.

Sensor 402 can be a sensor that is sensitive to light incident upon it. For example, sensor 402 can be sensitive to a wide range of wavelengths of light, or can be sensitive to a single wavelength or narrow range of wavelengths. The light can be visible light, infrared light, ultraviolet light, and/or other spectra of light, or can be any combination or portion of the above spectra.

In operation, sensor 402 can sense light that is transmitted through opening 408; here, incident light 404. If sensor 402 is sensitive to all or part of incident light 404, the sensor can generate a signal that is indicative of one or more characteristics of the incident light. For example, the signal can be indicative of the intensity of incident light 404 at one or more wavelengths, and/or can be indicative of the range of wavelengths included in the incident light. Further, the signal can be a voltage, a current, or any other signal that can convey information to the device for use by the device.

In some examples, sensor 402 can sense light that is transmitted through opening 408 during a period in time in which the display of the device (e.g., LCD, OLED, etc.) is momentarily turned off so as to prevent the light emitted from the display from interfering with the operation of the sensor. This technique can be used in conjunction with other sensor types described in this disclosure, as well as other sensor types that can be used for material detection according to examples of this disclosure. Further, this technique can be used regardless of the placement of sensor 402 on the device (i.e., in the border region, under the touch screen, over the touch screen, etc.).

As shown in FIG. 4A, sensor 402 may not be covered by any material. Therefore, ALS 400 can generate a signal indicative of non-coverage, and the device can operate accordingly, as described throughout this disclosure.

Figure 4B:
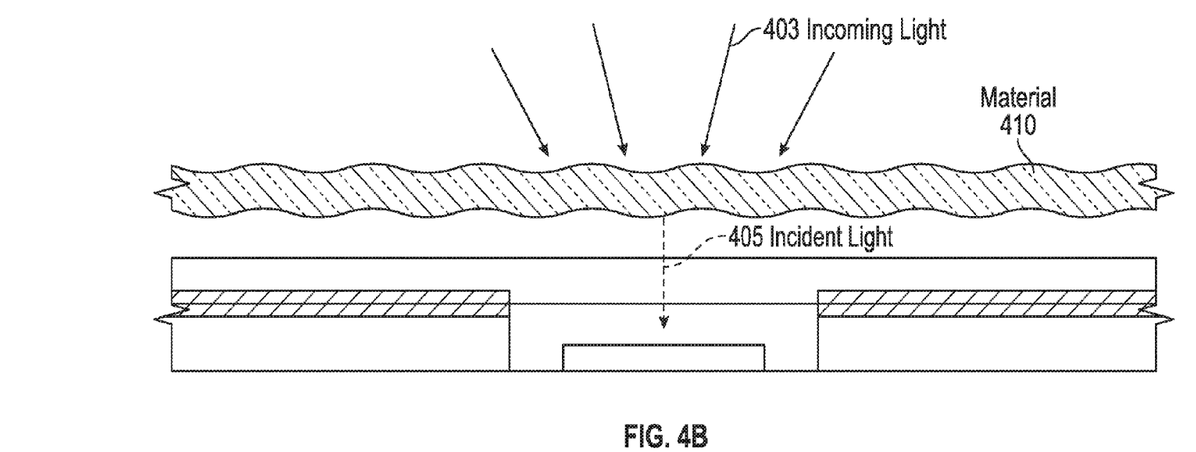
FIG. 4B illustrates exemplary operation of ALS when covered by a material.

FIG. 4B illustrates exemplary operation of ALS 400 when covered by material 410. Material 410 can be disposed between incoming light 403 and sensor 402. Incoming light 403 can hit material 410, and the material can transmit or pass incident light 405, which can then reach sensor 402. If material 410 is substantially opaque to the wavelengths of incoming light 403, incident light 405 can have approximately zero intensity (i.e., the material can transmit approximately no light). In such an instance, sensor 402 can detect almost no light incident on it, and the device can interpret such a detection as the device being covered by material. The device can then operate accordingly, as described throughout this disclosure.

In some examples, material 410 can transmit some or all of incoming light 403 as incident light 405. In some examples, incident light 405 can be of approximately the same wavelength distribution as incoming light 403. In some examples, material 410 may be biased towards only transmitting or passing certain ranges of wavelengths of incoming light 403. For example, material 410 may transmit or pass only wavelengths of incoming light 403 that are in the red light wavelength spectrum. In such a circumstance, sensor 402 can detect that incident light 405 is in the red light spectrum, and device can interpret this detection as indicative of the device being covered by red material (i.e., the sensor has detected the characteristic of the material being red, and the characteristic of the material to transmit or pass red light). This result can be in contrast to another scheme of material detection by sensor 402, which can result in the device interpreting the reception of any light—red or otherwise—as indicative of the device not being covered by material 410. The desired detection scheme can be implemented based on desired device performance.

In some examples, sensor 402 can be configured to be sensitive to certain wavelength ranges based on the desired operation of the device. If the device includes more than one sensor, each sensor can be tuned to the same or different wavelength ranges depending on desired operation of the device.

For example, sensor 402 can be configured to detect known spectra of light, and if the sensor detects a spectrum of light different from the known spectra, the device can determine that the device is covered. For example, sensor 402 can be configured to detect the spectra of sunlight, fluorescent lights, incandescent lights, and other known light sources. If sensor 402 detects a spectrum of blue light instead of the known spectra above, the device can determine that it is covered by blue fabric, and the device can change its operation accordingly.

In some examples, the device can determine whether a user is using the device indoors or outdoors based on the spectra of light detected by sensor 402. For example, if sensor 402 detects sunlight, device can determine that the user is outdoors, whereas if the sensor detects incandescent light, the device can determine that the user is indoors. Such information can be relevant to the determination of whether a watch or other wearable device, for example, is covered by a sleeve.

Figure 5A:
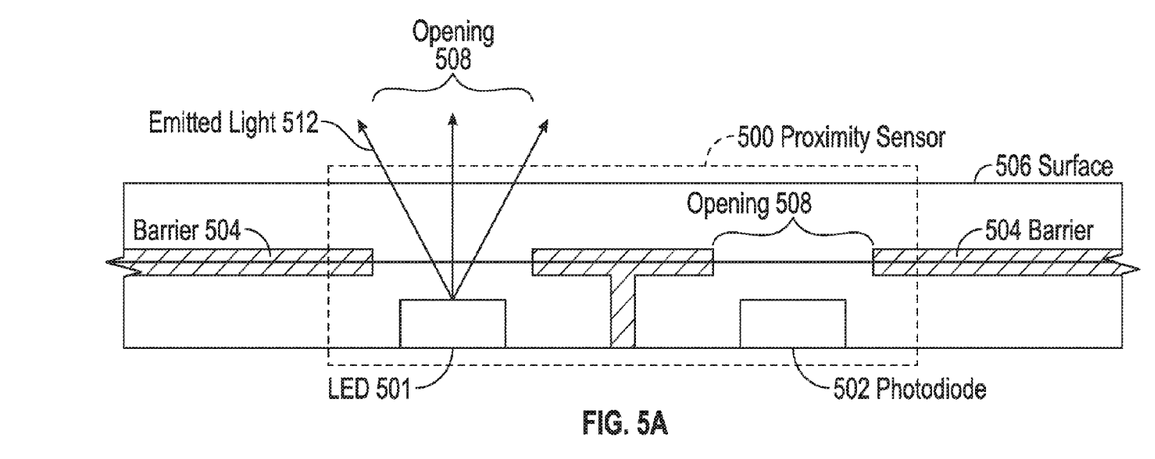
FIG. 5A illustrates the structure and operation of an exemplary proximity sensor for use in the device of the examples of this disclosure when not covered by a material.

In some examples, one or more of the sensors on the device of this disclosure can be proximity sensors. FIG. 5A illustrates the structure and operation of an exemplary proximity sensor 500 when not covered by a material for use in the device of the examples of this disclosure. Proximity sensor 500 can be formed of a light emitting diode (LED) 501 and photodiode 502 pair. Both LED 501 and photodiode 502 can be placed inside surface 506 of the device, and can be separated from each other by a barrier 504. Barrier 504 can be any region that can be substantially opaque to light, for example a dark ink layer or a light shield. LED 501 and photodiode 502 can have access to light in the environment external to the device by way of openings 508. Openings 508 can be any regions or materials that can allow the transmission of light through them, such that light from LED 501 can be transmitted out through an opening and surface 506, and light can be transmitted in from the surface through an opening to photodiode 502. For example, opening 508 can be a section of surface 506 that contains no structure at all such that LED 501 and photodiode 502 are exposed to an environment external to the device. Alternatively, opening 508 can be a section of surface 506 that includes structure and can allow at least some light transmission through it, such as an optically transparent glass. It is understood that other structures that can allow at least some light transmission from LED 501, and to photodiode 502, are suitable for use as openings 508.

LED 501 can be configured to emit light, such as emitted light 512. The light emitted by LED 501 can be one or more wavelengths of light, one or more ranges of wavelengths of light, or any combination thereof, based on the desired operation of the device. Photodiode 502 can be configured to detect light at the one or more wavelengths and/or ranges that LED 501 is configured to emit. As such, in operation, photodiode 502 can detect light emitted by LED 501 that has been reflected back onto the photodiode by a nearby object, signaling that proximity sensor 500 is covered by that object.

In the example of FIG. 5A, substantially no light emitted by LED 501 can be sensed by photodiode 502, because there is no object close to proximity sensor 500 to reflect all or part of emitted light 512 back down to the photodiode. The device can interpret this result as being indicative of no material coverage, and can adjust its operation accordingly.

The wavelengths to be emitted and/or sensed can be chosen such that wavelengths of light that can generally exist in an operating environment of the device will not oversaturate photodiode 502, which can cause inaccurate operation of proximity sensor 500. For example, if photodiode 502 is configured to sense wavelengths of light that include wavelengths that are part of sunlight, the photodiode can become oversaturated when the device is used outdoors during the day. To avoid such a result, LED 501 and photodiode 502 can be configured to emit/detect wavelengths of light that are outside of the range of wavelengths included in sunlight, or at a minimum will not saturate the photodiode in sunlight.

Figure 5B:
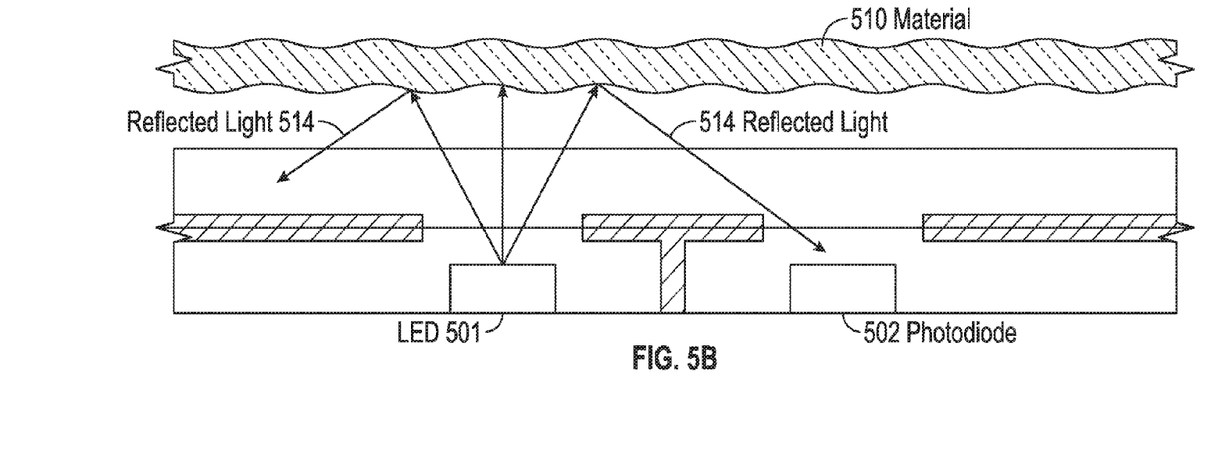
FIG. 5B illustrates exemplary operation of a proximity sensor when covered by a material.

FIG. 5B illustrates exemplary operation of proximity sensor 500 when covered by material 510. As stated above, LED 501 can emit emitted light 512. Because material 510 can be sufficiently close to surface 506, the material can reflect part or all of emitted light 512 that is incident upon it as reflected light 514. Some of reflected light 514 can be reflected towards photodiode 502. Photodiode 502 can sense the part of reflected light 514 that is incident upon it, and the device can interpret the photodiode's measurement as being indicative of an object, in this case material 510, covering the device. The device can then adjust its operation accordingly.

As stated above, in some examples, LED 501 and photodiode 502 can be configured to operate at wavelengths of light outside of wavelengths that generally exist in an operating environment of the device. In this way, detection of ambient light (e.g., sunlight) by photodiode 502 should not result in an erroneous determination that an object is reflecting the ambient light towards the photodiode, and thus that the device is covered by the object.

In some examples, LED 501 and photodiode 502 can be configured based on the types of materials 510 that are desired to be detected. For example, some materials can reflect certain wavelengths of light more than other wavelengths of light. If it is desired to detect such materials, LED 501 can be configured to emit light at the corresponding wavelengths, and photodiode 502 can be configured to detect primarily those wavelengths of light that will likely be reflected by such materials (i.e., the proximity sensor can detect the light reflection characteristics of the material).

As stated above, the device of the examples of this disclosure can utilize only ALS sensors, only proximity sensors, or both types of sensors to determine whether and/or how much the device is covered by a material, and thus to determine that a user is likely not looking at, and cannot see, the screen or face on the device. It is understood that other sensors that can detect the absence or presence of a material covering the device—such as a camera or other type of sensor—are also within the scope of this disclosure. Cameras can be suitable for material detection because cameras can provide for many pixels of resolution in a single area of the camera sensor, allowing for high-resolution detection of a material covering a portion of the camera sensor (e.g., the edge of a user's sleeve). Regardless of the type or types of sensors used, the device can include multiple sensors to provide for better device performance.

Figure 6:
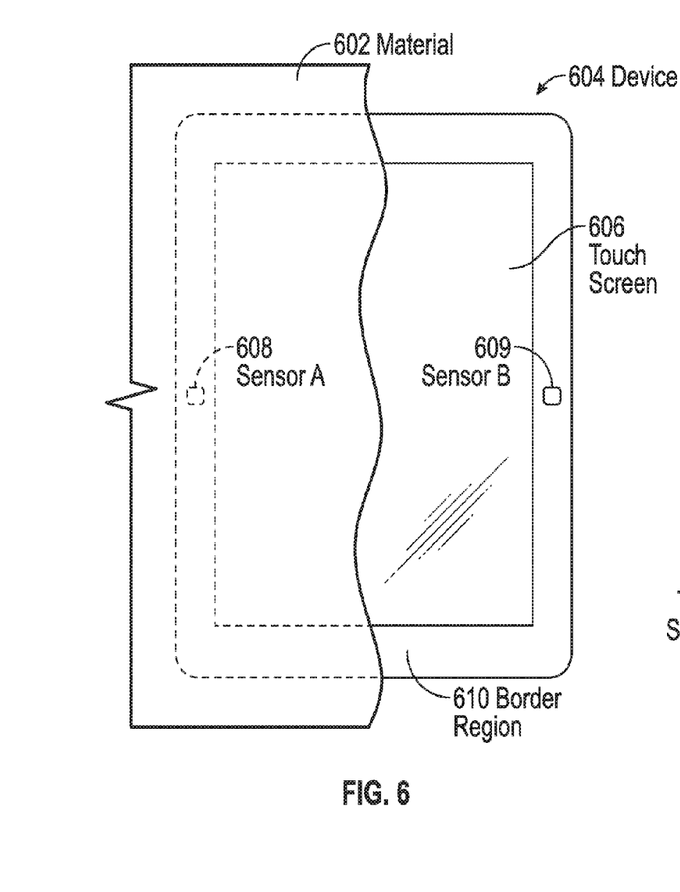
FIG. 6 illustrates an exemplary device that includes two sensors in a border region.

FIG. 6 illustrates exemplary device 604 that includes two sensors, 608 and 609, in border region 610. Here, the left side of device 604 is covered by material 602. Because it is covered by material 602, sensor A 608 can detect a covered scenario. Sensor B 609 on the other hand, may not detect coverage. Because device 604 can include both sensor A 608 and sensor B 609, the device can determine that it is partially covered. Further, device 604 can determine that it is covered on its left side and not its right side. In some examples, sensor A 608 may not be completely covered by material 602, if, for example, the material covering the device is a loose fabric that moves a lot. In this case, coverage, or the direction of coverage, can also be determined by sensing a measured light gradient between sensor A 608 and sensor B 609, whereby sensor A receives less light on average than sensor B. Sensor readings from multiple sensors, as above, can also be used to determine not only the fact of partial coverage of device 604 by material 602, but also the extent of partial coverage of the device by the material, the extent of coverage being a characteristic of the material covering the device.

This ability to determine partial coverage, and to be able to determine the direction of partial coverage, can be used by device 604 for increased functionality. For example, if device 604 is a watch and is generally covered by material 602 from the left direction, the device can interpret that it is being worn on the left wrist of a user. In some examples, in response to a determination of being partially covered, device 604 can adjust what is displayed on touch screen 606 so as to bias the displayed information toward the side of the device that is not covered, so that useful information is not obscured by material 602. The functionalities described above are provided by way of example only, and it is understood that many other functionalities are also within the scope of this disclosure.

Figure 7:
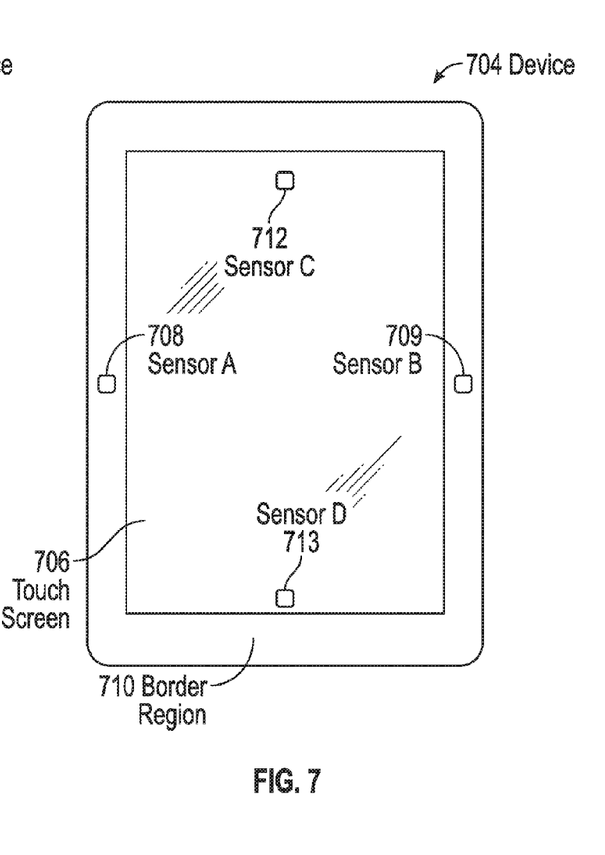
FIG. 7 illustrates an exemplary configuration of a device having sensors in a border region and a touch screen.

In some examples, the device can include sensors in both its border region and in its touch screen or device face. FIG. 7 illustrates an exemplary configuration of device 704 having sensors in border region 710 and touch screen 706. The sensors (708, 709, 712 and 713) can all be of the same type or of different types, as described above. Further, it is understood that the functionality of the device of FIG. 7 can expand upon the functionalities described throughout this disclosure.

Figure 8:
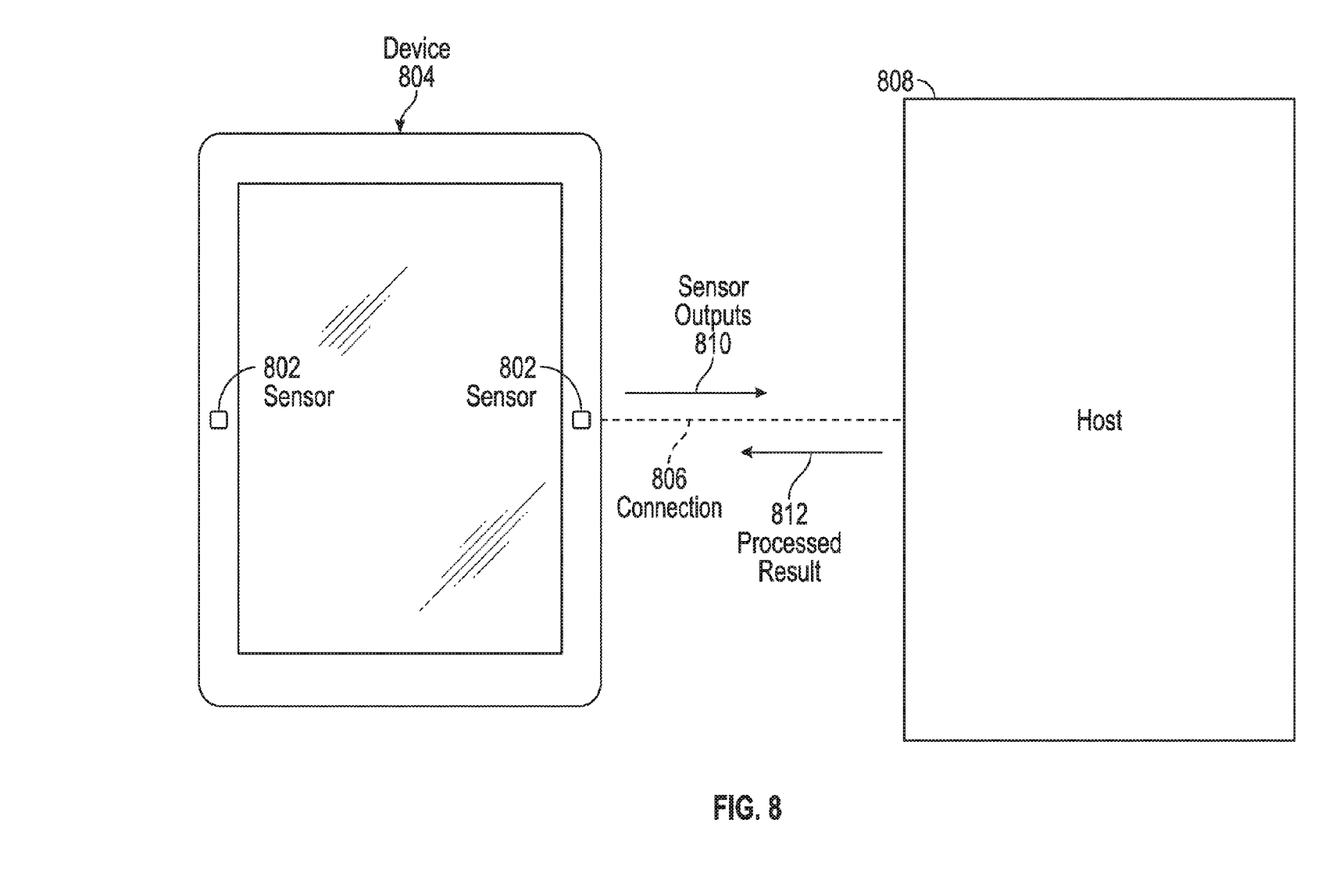
FIG. 8 illustrates an example configuration in which a device is connected to a host, which performs processing of sensor outputs from the device.

In some examples, the sensors described above, such as the ALS sensors and the proximity sensors, can be included in the actual device of this disclosure, and processing of the sensor outputs can be performed on the device as well. However, in some examples, the processing of the outputs from the sensors need not be performed on the device itself. FIG. 8 illustrates an example configuration in which device 804 is connected to host 808, which performs processing of sensor outputs 810. Device 804 can include sensors 802, and can be connected to host 808 via connection 806. Device 804 can include a communication interface to which connection 806 can be connected. Host 808 can be any device external to device 804. For example, if device 804 is a mobile telephone, host 808 can be a computer; if device 804 is a watch or other wearable device, host 808 can be a mobile telephone. Device 804 and host 808 need not be different types of devices; both can be mobile telephones, for example.

Connection 806 can be any communication link that is suitable for communication between device 804 and host 808. For example, connection 806 can be a connection over a physical cable that can be connected between device 804 and host 808. The physical cable can be based on, for example, standards such as Universal Serial Bus (USB), FireWire, Thunderbolt, or any other format for communication over a cable. Alternatively, connection 806 can be a wireless connection between device 804 and host 808. The wireless connection can be based on standards such as Wi-Fi, Bluetooth, infrared, or any other format for wireless communication.

In operation, instead of processing the outputs from sensors 802 itself, device 804 can send sensor outputs 810 to host 808 for processing. In turn, host 808 can process sensor outputs 810, can determine, based on the sensor outputs, whether device 804 is covered, and can send processed result 812 back to the device. Based on processed result 812, device 804 can adjust its operation accordingly. By offloading the processing of the outputs from sensors 802, device 804 can conserve power, and if the device is battery powered, can prolong battery life by doing so. Such processing offloading can also enable device 804 to remain small and portable, if desired, as space that could otherwise be required for processing logic can be freed up on the device.

In addition to adjusting its operation based on real-time sensor measurements, the device of the examples of this disclosure can determine its mode of operation based on histories and/or patterns of outputs from the sensors of this disclosure. For example, in the device of FIG. 6, if device 604 is a watch, and if sensor A 608 is historically covered more often than sensor B 609, the device can determine that it is being worn on a user's left wrist, and that the user is likely right-handed. This knowledge can help the device determine whether it is being covered by a material such that the user cannot see the screen. For example, if device 604 receives a measurement of coverage from sensor A 608 on the left, it can determine that it is likely being covered by the user's sleeve. If, on the other hand, device 604 receives a measurement of coverage from sensor B 609 on the right, it is likely that something other than the user's sleeve is covering the device, and the device can respond accordingly.

As another example, device 604 may be a watch. If sensors A 608 and B 609 on the watch are generally covered from day to day, and if one day sensors A and B are only marginally covered (i.e., the sensors detect the presence of more than a threshold of light), the watch can determine that a user, instead of wearing an opaque fabric, is wearing a fabric that is more light transmissive on that day. The watch can determine this because it can infer, for example, based on the history of coverage, that the user almost always wears long-sleeved shirts, and is likely doing so again on this day. Importantly, however, the watch or other wearable device can still determine that it is covered by fabric, regardless. In such a circumstance, the device can still turn off its touch screen as not likely to be visible to the user, whereas if the sensor history had not been known and considered, the device may have turned its screen on in response to having detected the presence of light.

In some examples, in addition to the ALS and/or proximity sensors of this disclosure, the device can use information from other sensors and data sources to aid it in its determination as to whether a user is likely to look at the screen on the device, and therefore whether the device can turn the screen off in response. Some of these other sensors and data sources can provide calendar information (e.g., date, time, meetings, events, appointments, etc.), weather information, location information (e.g., GPS), movement information (e.g., from an inertial sensor), biometric information, battery level information, and any other information that might be relevant to the device's determination. For example, if, according to a user's calendar, the user is currently in a meeting, the device can assume that the user is likely indoors, and any measurements made by the ALS and/or proximity sensors on the device can be interpreted in view of the user being indoors. As another example, if the device is a watch, and local weather information indicates high temperatures in the area, the device can bias its ALS and/or proximity sensor determinations towards the device not being covered by a material, because a user is less likely to be wearing long sleeves, which could cover the watch, on a hot day. As a further example, if the device is a watch, the device can determine whether a user is sleeping by using inertial sensors, biometric sensors, calendar information, and possibly other sensors. If the user is sleeping, the device can adjust its mode of operation accordingly, as described above, to conserve battery power (e.g., the device can turn off its touch screen and its processor).

In some examples, the device can bias all coverage determinations towards the device being uncovered (i.e., presenting a brighter image on the touch screen, and/or leaving or turning the touch screen on) so as to reduce the likelihood that the device will interfere with a user's experience with the device by turning off the touch screen at a non-ideal time.

The sensors and/or data sources from which the above-described additional information can be received can be on the device itself, on one or more external devices, or any combination thereof. If on an external device, the device can receive the relevant information via a communication link as in FIG. 8.

Figure 9:
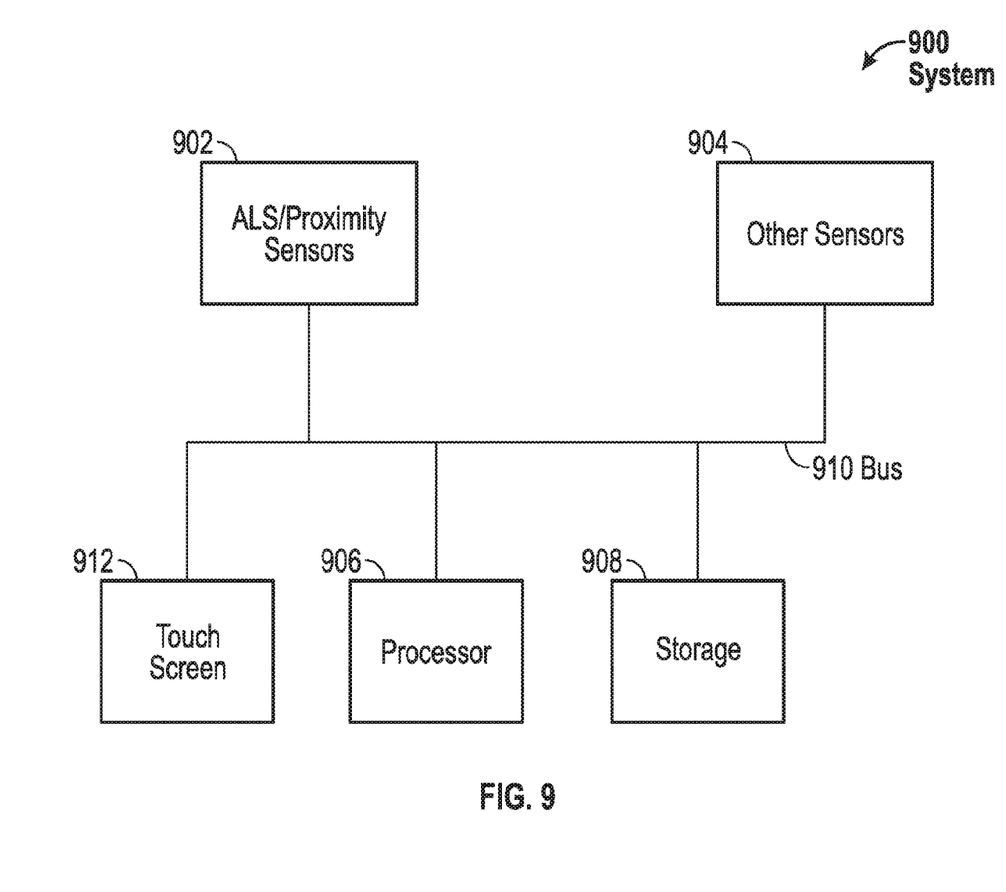
FIG. 9 illustrates an example system according to examples of this disclosure.

FIG. 9 illustrates example system 900 according to examples of this disclosure. System 900 can include touch screen 912, one or more processors 906 and storage 908. System 900 can also include one or more ALS and/or proximity sensors 902, and other sensors 904, such as those described above. Other sensors 904 can also include other sources of information, as described above. All of the above can be communicatively coupled via bus 910.

ALS and/or proximity sensors 902 can output sensor outputs to processor 906 for processing via bus 910. Other sensors 904, if included in system 900, can also output sensor outputs to processor 906 for processing via bus 910. Touch screen 912 can be the touch screen on the device according to examples of this disclosure. Storage 908 can be any non-transitory computer-readable storage medium, and can store, for example, history and/or pattern data relating to measurements from ALS and/or proximity sensors 902 and other sensors 904. Storage 908 can also store instructions that can cause processor 906 to perform the material detection processing, as described in this disclosure. Processor 906 can adjust the device's operation based on the ALS and/or proximity sensors 902 and other sensors 904, as described in this disclosure.

The various components of system 900 can all be on a single device or can be distributed amongst multiple devices. For example, ALS and/or proximity sensors 902 and touch screen 912 can be on a mobile telephone, and other sensors 904, processor 906 and storage 908 can be on a host, as described with reference to FIG. 8. Regardless of whether processor 906 for processing sensor outputs is on a host, the device (e.g., the mobile telephone) can still include sufficient logic for adjusting the operating states of its various components (e.g., the touch screen), based on the results of the processing done by the host. Relatedly, bus 910 can be a physical bus line, a wireless connection, or any combination of the two (i.e., portions of bus line can be physical bus lines while other portions can be wireless connections). Bus 910 merely denotes the ability of the various components of system 900 to communicate with each other, if needed, via any suitable communication link.

For example, in the example above, bus 910 between ALS and/or proximity sensors 902 and touch screen 912 can be a physical bus line, because the ALS and/or proximity sensors and the touch screen can be on the same device. Similarly, bus 910 between processor 906, storage 908 and other sensors 904 can also be a physical bus line because those components can be on the same host. However, the connection between the two physical bus line segments can be a wireless connection, to allow for the device to communicate with the host.

Therefore, according to the above, some examples of the disclosure are directed to a device comprising one or more sensors configured to detect a material covering the device, and logic coupled to the one or more sensors, the logic configured to detect one or more characteristics of the material covering the device, and change an operating state of the device based on the detected one or more characteristics. Additionally or alternatively to one or more of the examples disclosed above, in some examples, the one or more sensors comprise one or more ambient light sensors (ALS). Additionally or alternatively to one or more of the examples disclosed above, in some examples, the one or more sensors comprise one or more proximity sensors. Additionally or alternatively to one or more of the examples disclosed above, in some examples, the one or more sensors comprise one or more cameras. Additionally or alternatively to one or more of the examples disclosed above, in some examples, the device further comprises a processor, wherein changing the operating state of the device comprises changing an operating state of the processor. Additionally or alternatively to one or more of the examples disclosed above, in some examples, the device further comprises a touch panel, wherein changing the operating state of the device comprises changing an operating state of the touch panel. Additionally or alternatively to one or more of the examples disclosed above, in some examples, the device further comprises a display, wherein changing the operating state of the device comprises changing an operating state of the display. Additionally or alternatively to one or more of the examples disclosed above, in some examples, detecting the one or more characteristics comprises detecting that the material is covering at least a portion of the device, and changing the operating state comprises putting the processor in a low-power state. Additionally or alternatively to one or more of the examples disclosed above, in some examples, detecting the one or more characteristics comprises detecting that the material is covering at least a portion of the touch panel, and changing the operating state comprises turning off at least the portion of the touch panel. Additionally or alternatively to one or more of the examples disclosed above, in some examples, detecting the one or more characteristics comprises detecting that the material is covering at least a portion of the display, and changing the operating state comprises reducing a brightness of at least the portion of the display. Additionally or alternatively to one or more of the examples disclosed above, in some examples, detecting the one or more characteristics comprises detecting that the material is covering at least a portion of the display, and changing the operating state comprises turning off at least the portion of the display. Additionally or alternatively to one or more of the examples disclosed above, in some examples, detecting the one or more characteristics comprises detecting one or more wavelengths of light transmitted by the material to the one or more ALS. Additionally or alternatively to one or more of the examples disclosed above, in some examples, detecting the one or more characteristics comprises detecting a direction of coverage of the material. Additionally or alternatively to one or more of the examples disclosed above, in some examples, detecting the one or more characteristics comprises detecting a color of the material. Additionally or alternatively to one or more of the examples disclosed above, in some examples, the logic is further configured to determine a usage state of the device based on the one or more characteristics. Additionally or alternatively to one or more of the examples disclosed above, in some examples, the logic is further configured to detect a pattern of the one or more characteristics, and changing the operating state of the device comprises changing the operating state of the device based on the pattern. Additionally or alternatively to one or more of the examples disclosed above, in some examples, changing the operating state of the device comprises changing the operating state of the device based on information in addition to the one or more characteristics. Additionally or alternatively to one or more of the examples disclosed above, in some examples, the device further comprises a communication interface coupled to the logic, the communication interface configured to receive the information from an external device.

Some examples of the disclosure are directed to a device comprising one or more sensors configured to detect a material covering the device, a communication interface coupled to the one or more sensors, the communication interface configured to send one or more outputs from the one or more sensors to an external device, and receive one or more characteristics of the material from the external device, and logic coupled to the communication interface, the logic configured to change an operating state of the device based on the one or more characteristics.

Some examples of the disclosure are directed to a method comprising detecting one or more characteristics of a material covering a device, and changing an operating state of the device based on the detected one or more characteristics.

Some examples of the disclosure are directed to a method comprising sending, to a second device, one or more outputs from one or more sensors configured to detect a material covering a first device, receiving, from the second device, one or more characteristics of the material, and changing an operating state of the first device based on the one or more characteristics.

Some examples of the disclosure are directed to a non-transitory computer-readable storage medium having stored therein instructions, which when executed by a device, cause the device to perform a method comprising detecting one or more characteristics of a material covering the device, and changing an operating state of the device based on the detected one or more characteristics.

Some examples of the disclosure are directed to a non-transitory computer-readable storage medium having stored therein instructions, which when executed by a first device, cause the device to perform a method comprising sending, to a second device, one or more outputs from one or more sensors configured to detect a material covering the first device, receiving, from the second device, one or more characteristics of the material, and changing an operating state of the first device based on the one or more characteristics.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A device comprising:
   one or more sensors configured to detect a material covering the device; and
   logic coupled to the one or more sensors, the logic configured to:
      detect one or more characteristics of the material covering the device, wherein the material has a first characteristic if the material is covering a first portion of the device from a first direction, and has a second characteristic if the material is covering the first portion of the device from a second direction different from the first direction, and
      change an operating state of the device based on the detected one or more characteristics, wherein changing the operating state comprises:
         in accordance with the material having the first characteristic, the device entering a first operating state, and
         in accordance with the material having the second characteristic, the device entering a second operating state different from the first operating state.

2. The device of claim 1, wherein the one or more sensors comprise one or more ambient light sensors (ALS).

3. The device of claim 2, wherein detecting the one or more characteristics comprises detecting one or more wavelengths of light transmitted by the material to the one or more ALS.

4. The device of claim 1, wherein the one or more sensors comprise one or more proximity sensors.

5. The device of claim 1, wherein the one or more sensors comprise one or more cameras.

6. The device of claim 1, further comprising a processor, wherein changing the operating state of the device comprises changing an operating state of the processor.

7. The device of claim 6, wherein:
   detecting the one or more characteristics comprises detecting that the material is covering at least a portion of the device, and
   changing the operating state comprises putting the processor in a low-power state.

8. The device of claim 1, further comprising a touch panel, wherein changing the operating state of the device comprises changing an operating state of the touch panel.

9. The device of claim 8, wherein:
  detecting the one or more characteristics comprises detecting that the material is covering at least a portion of the touch panel, and
  changing the operating state comprises turning off at least the portion of the touch panel.

10. The device of claim 1, further comprising a display, wherein changing the operating state of the device comprises changing an operating state of the display.

11. The device of claim 10, wherein:
  detecting the one or more characteristics comprises detecting that the material is covering at least a portion of the display, and
  changing the operating state comprises reducing a brightness of at least the portion of the display.

12. The device of claim 10, wherein:
  detecting the one or more characteristics comprises detecting that the material is covering at least a portion of the display, and
  changing the operating state comprises turning off at least the portion of the display.

13. The device of claim 1, wherein detecting the one or more characteristics comprises detecting a color of the material.

14. The device of claim 1, wherein the logic is further configured to determine a usage state of the device based on the one or more characteristics.

15. The device of claim 1, wherein:
  the logic is further configured to detect a pattern of the one or more characteristics, and
  changing the operating state of the device comprises changing the operating state of the device based on the pattern.

16. The device of claim 1, wherein changing the operating state of the device comprises changing the operating state of the device based on information in addition to the one or more characteristics.

17. The device of claim 16, further comprising a communication interface coupled to the logic, the communication interface configured to receive the information from an external device.

18. A device comprising:
  one or more sensors configured to detect a material covering the device;
  a communication interface coupled to the one or more sensors, the communication interface configured to send one or more outputs from the one or more sensors to an external device, and receive one or more characteristics of the material from the external device, wherein the material has a first characteristic if the material is covering a first portion of the device from a first direction, and has a second characteristic if the material is covering the first portion of the device from a second direction different from the first direction; and
  logic coupled to the communication interface, the logic configured to change an operating state of the device based on the one or more characteristics, wherein changing the operating state comprises:
    in accordance with the material having the first characteristic, the device entering a first operating state, and
    in accordance with the material having the second characteristic, the device entering a second operating state different from the first operating state.

19. A method comprising:
  detecting one or more characteristics of a material covering a device, wherein the material has a first characteristic if the material is covering a first portion of the device from a first direction, and has a second characteristic if the material is covering the first portion of the device from a second direction different from the first direction; and
  changing an operating state of the device based on the detected one or more characteristics, wherein changing the operating state comprises:
    in accordance with the material having the first characteristic, the device entering a first operating state, and
    in accordance with the material having the second characteristic, the device entering a second operating state different from the first operating state.

20. A method comprising:
  sending, to a second device, one or more outputs from one or more sensors configured to detect a material covering a first device;
  receiving, from the second device, one or more characteristics of the material, wherein the material has a first characteristic if the material is covering a first portion of the device from a first direction, and has a second characteristic if the material is covering the first portion of the device from a second direction different from the first direction; and
  changing an operating state of the first device based on the one or more characteristics, wherein changing the operating state comprises:
    in accordance with the material having the first characteristic, the device entering a first operating state, and
    in accordance with the material having the second characteristic, the device entering a second operating state different from the first operating state.

21. A non-transitory computer-readable storage medium having stored therein instructions, which when executed by a device, cause the device to perform a method comprising:
  detecting one or more characteristics of a material covering the device, wherein the material has a first characteristic if the material is covering a first portion of the device from a first direction, and has a second characteristic if the material is covering the first portion of the device from a second direction different from the first direction; and
  changing an operating state of the device based on the detected one or more characteristics, wherein changing the operating state comprises:
    in accordance with the material having the first characteristic, the device entering a first operating state, and
    in accordance with the material having the second characteristic, the device entering a second operating state different from the first operating state.

22. A non-transitory computer-readable storage medium having stored therein instructions, which when executed by a first device, cause the device to perform a method comprising:
  sending, to a second device, one or more outputs from one or more sensors configured to detect a material covering the first device;
  receiving, from the second device, one or more characteristics of the material, wherein the material has a first characteristic if the material is covering a first portion of the device from a first direction, and has a second characteristic if the material is covering the first portion of the device from a second direction different from the first direction; and changing an operating state of the first device based on the one or more characteristics, wherein changing the operating state comprises:
- in accordance with the material having the first characteristic, the device entering a first operating state, and
- in accordance with the material having the second characteristic, the device entering a second operating state different from the first operating state.

* * * * *